United States Patent [19]

Bucher

[11] Patent Number: 4,686,566
[45] Date of Patent: Aug. 11, 1987

[54] AUTOMATIC INITIATION OF TARGET CROSSOVER RECOVERY IN A PYROELECTRIC CAMERA

[75] Inventor: Hans R. Bucher, Boulder, Colo.

[73] Assignee: Xedar Corporation, Boulder, Colo.

[21] Appl. No.: 889,693

[22] Filed: Jul. 28, 1986

[51] Int. Cl.[4] .............................................. H04N 5/33
[52] U.S. Cl. .................................. 358/113; 250/333; 250/334; 358/163
[58] Field of Search ................ 358/113, 163; 250/333, 250/334

[56] References Cited

U.S. PATENT DOCUMENTS

| | | | |
|---|---|---|---|
| 4,031,394 | 6/1977 | Felix | 250/334 |
| 4,072,863 | 2/1978 | Roundy | 250/334 |
| 4,100,574 | 7/1978 | Felix | 358/113 |
| 4,177,483 | 12/1979 | Felix | 358/113 |
| 4,225,882 | 9/1980 | Moiroud | 358/113 |
| 4,288,817 | 9/1981 | Igel | 358/163 |
| 4,437,118 | 3/1984 | Singer | 358/113 |
| 4,481,535 | 11/1984 | Hodd | 358/113 |

Primary Examiner—Howard W. Britton
Attorney, Agent, or Firm—Robert E. Harris

[57] ABSTRACT

A system and method are disclosed for initiating target crossover recovery in a pyroelectric camera by electronically detecting crossover and automatically initiating recovery in response thereto. The video signal appearing at the output of the video amplifier during readout of the vidicon tube is coupled to a level detector to detect crossover by sensing a positive signal having an amplitude greater than any such signal producible during readout arising from an optical input to the video amplifier, with reliability of detection being enhanced by use of an automatic balancing circuit providing a stable reference. The output from the level detector, indicative of sensed crossover of an area (or all) of the target of the pyroelectric tube, is either directly used to trigger an automatic target poling circuit which returns the pyroelectric tube back to normal operation, or is coupled to a time delay for delaying repoling of the target to allow an image to continue for a period of time after an area of the target has been crossed over in order to avoid loss of information.

18 Claims, 6 Drawing Figures

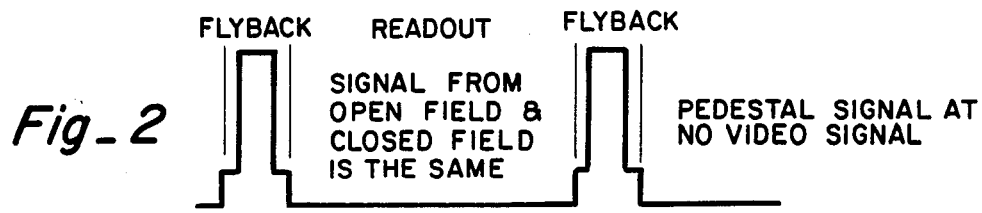
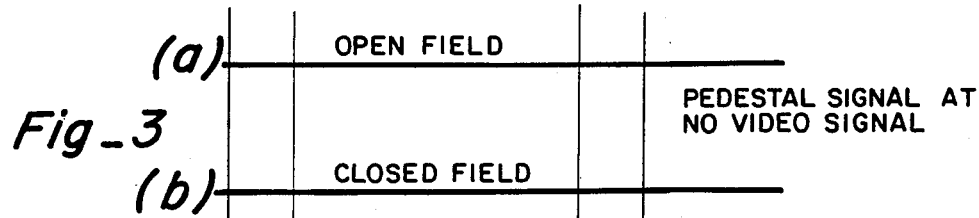
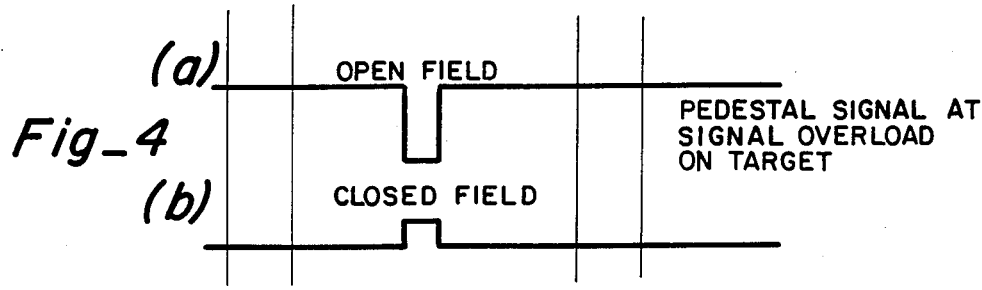
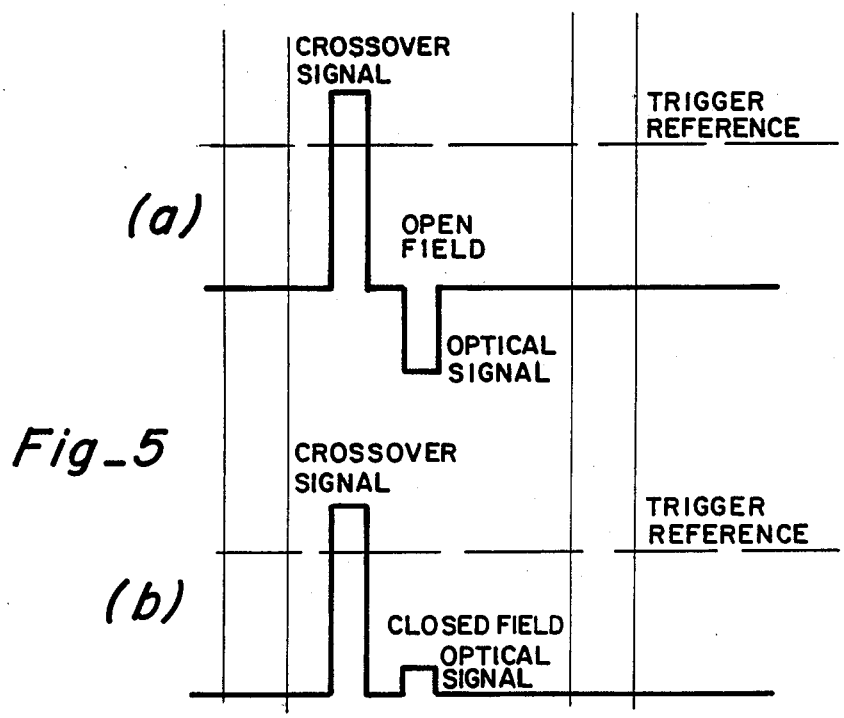

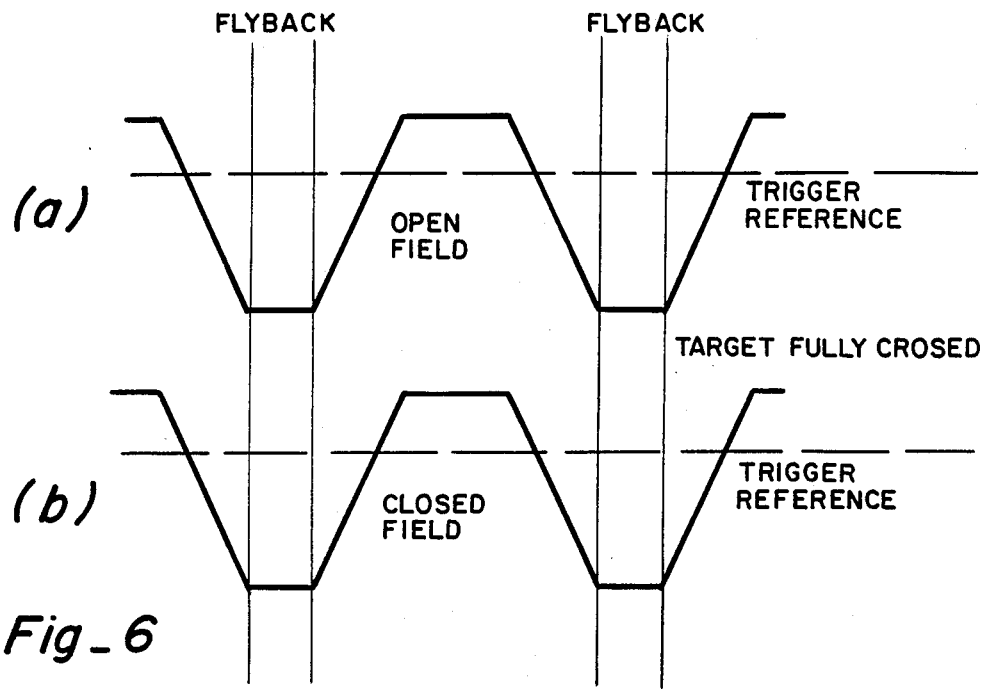
Fig_6

4,686,566

AUTOMATIC INITIATION OF TARGET CROSSOVER RECOVERY IN A PYROELECTRIC CAMERA

FIELD OF THE INVENTION

This invention relates to a pyroelectric camera, and, more particularly, relates to a system and method for initiating target crossover recovery in such a camera.

BACKGROUND OF THE INVENTION

As is well known, a pyroelectric camera is basically a television camera that is capable of producing an infrared television picture. A pyroelectric vidicon tube is utilized as the input of the pyroelectric camera to sense a thermal image of a scene by receiving thermal energy emitted from the scene and, responsive thereto, an electrical output signal is provided, which electrical output signal is then processed by associated electronic circuitry to provide a composite video output signal.

A signal processing system for a chopper-type pyroelectric camera is shown and described in U.S. Pat. No. 4,481,535 issued Mar. 6, 1984 to Hodd and Bucher, and which patent is assigned to the assignee of this invention.

It is also known that operation of a pyroelectric camera requires that tube operation be stabilized, which occurs when the target is read by low energy electrons. Destabilization, however, occurs whenever the electrons arrive with sufficient energy to create a large number of secondary electrons then the target can accept from the reading beam in order to discharge. In this situation, the secondary electron emission coefficient is greater than one. The effect is that the target surface facing the electron gun of the camera tube is charged up to the field mesh potential (which is several hundred volts) and, if left in this condition for any prolonged length of time, the camera, or vidicon, tube is usually damaged. In addition, the tube is not capable of producing an image if in the crossover mode.

Destabilization of pyroelectric camera operation can occur during turn-on of the camera system, can also occur if parts of the target are not scanned, and/or can also be caused by a thermal image overload into the system that increases the pedestal level such that the secondary emission coefficient becomes greater than one.

The process to recover the target from crossover is well known and has been implemented by several different means in accordance with the recommendation from the manufacturers of pyroelectric tubes. The determination that the target is in crossover and the initiation for recovery, however, has heretofore had to be made by the operator since there has heretofore been no known reliable way to electronically detect this condition and automatically initiate recovery.

SUMMARY OF THE INVENTION

This invention provides a novel and reliable system and method for electronically detecting target crossover and, responsive thereto, automatically initiating recovery.

It is therefore an object of this invention to provide a system and method for detecting target crossover and initiating recovery.

It is another object of this invention to provide a system and method for electronically detecting target crossover and automatically initiating recovery.

It is still another object of this invention to provide a system and method for electronically detecting target crossover and, responsive thereto, providing an output signal to automatically initiate recovery either immediately or after a delay to avoid loss of information.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIGS. 2 through 6 show a series of typical wave forms illustrating operation of the invention.

DESCRIPTION OF THE INVENTION

Figure 1:
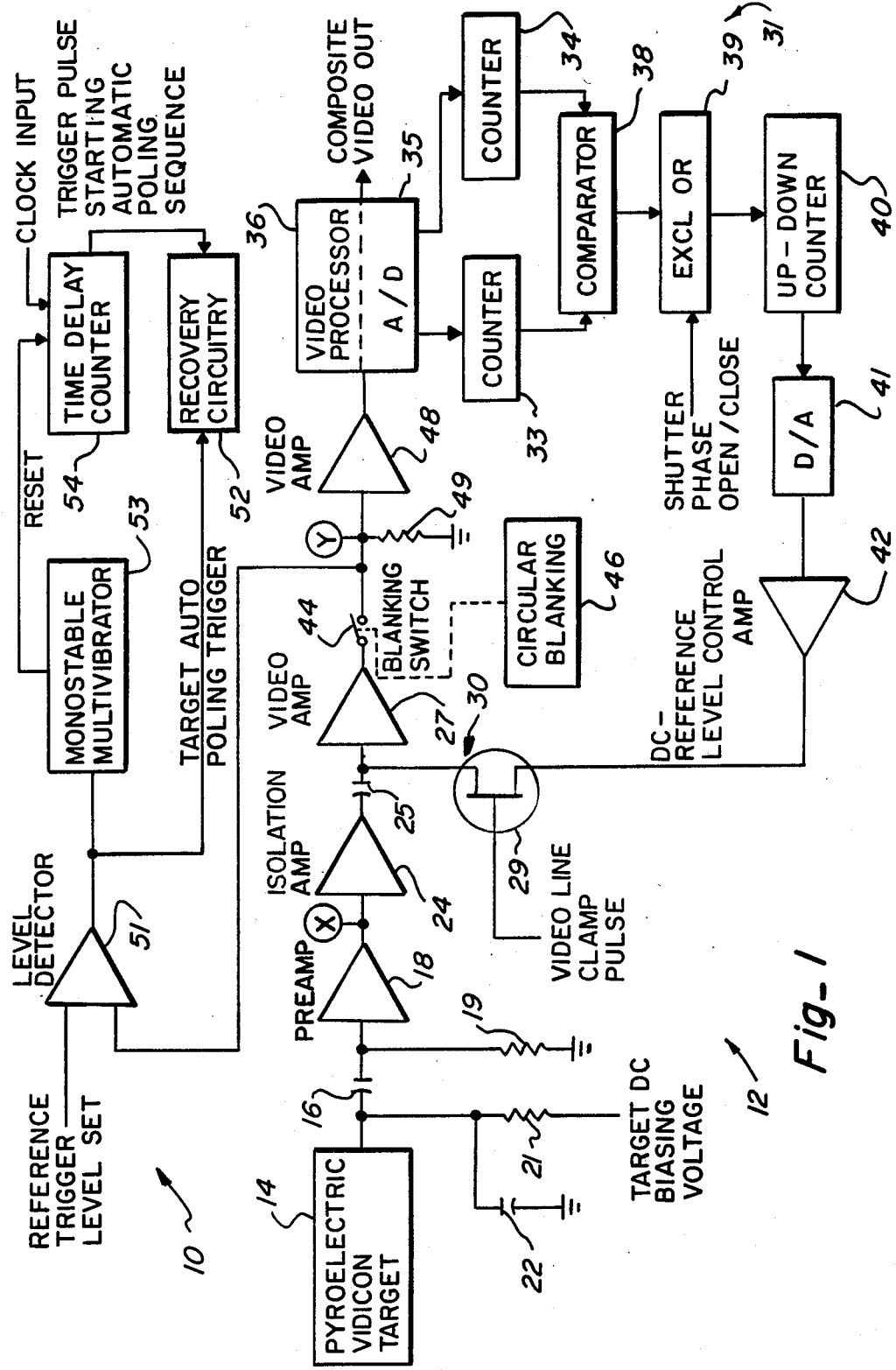
FIG. 1 is a block and schematic electrical diagram of the automatic recovery initiation system of this invention shown incorporated into pyroelectric camera circuitry.

The automatic recovery initiation system 10 of this invention is shown in FIG. 1 incorporated into pyroelectric signal processing circuitry 12. Since pyroelectric cameras, as well as processing circuitry associated therewith, are known, the details of such cameras and associated circuitry have been included herein only to the extent deemed necessary to illustrate the invention.

As brought out above, a signal processing system for a chopper-type pyroelectric camera is shown and described in U.S. Pat. No. 4,481,535. This invention is based upon the system shown in U.S. Pat. No. 4,481,535, and, accordingly, this patent is hereby included by reference herein.

As shown in FIG. 1, the output from target 14 of the pyroelectric vidicon tube is coupled through capacitor 16 to preamplifier 18 (the input side of which preamplifier is returned to ground through resistor 19). As also shown in FIG. 1, the DC biasing voltage is coupled to target 14 through resistor 21, and the junction of capacitor 16 and resistor 31 has a capacitor 22 to ground connected therewith.

The output of preamplifier 18 is coupled through isolation amplifier 24 and capacitor 25 to video amplifier 27. The input side of video amplifier 27 is also connected with field effect transistor 29 of DC restorer circuitry 30, through which a video line clamp pulse is applied along with an input from automatic balancing circuit 31, which balancing circuit supplies a DC-reference level control to the video amplifier.

Reliability of detection of a crossed over area in the target is enhanced by use of automatic balancing circuit 31, which assures that the video signal pedestal level remains at or near ground or some DC-reference level giving the level detector a stable reference from which to detect, thus assuring that the level detector will sense the crossover on the tube target.

Automatic balancing circuit 31 includes counters 33 and 34 which receive digital outputs from analog-to-digital converter 35 of video processing circuitry 36 (shown in greater detail in U.S. Pat. No. 4,481,535). The analog input DC level is set to the mid-range input level of analog-to-digital converter 35 to maximize the useful dynamic range since the signal generated by the thermal scene is centered about the DC-pedestal set at the A/D converter input. Counter 33 counts the times that the most significant bits (MSBs) are present in the field and counter 34 counts the times that the least significant bits (LSBs) are present in the same field.

The output from counters 33 and 34 are coupled to comparator 38, the output of which is coupled through EXCLUSIVE OR steering gate 39 to up-down counter 40. The polarity of the comparator output is reversed by EXCLUSIVE OR gate 39, which gate also receives an input based upon the timing control of the processing circuitry so that gate 39 is controlled by the timing based on the expected video polarity. The output from counter 40 is then coupled to D/A converter 41. Comparator 38 compares the two counts from counters 33 and 34 and, depending on the presence of the number of MSBs or LSBs in each field, causes up-down counter 40 to adjust the level of DC restorer 30. As shown in FIG. 1, the analog output from D/A converter 41 is coupled through amplifier 42, the output of which provides an input to field effect transistor 29 of DC restorer unit 30. Using this method, the pedestal level will always be zeroed at one-half the range level of the input of A/D converter 35 regardless of scene content.

The output from video amplifier 27 is coupled through blanking switch 44, controlled by circular blanking unit 46 (again shown in greater detail in U.S. Pat. No. 4,481,535), to video amplifier 48 (the input of which is returned to ground through resistor 49). The output from video amplifier 48 is coupled to video processor circuitry 36 (shown in greater detail, for example, in U.S. Pat. No. 4,481,535) which provides the composite video output.

Detection of crossover, according to this invention, is effected by automatic target recovery initiation system 10. As shown in FIG. 1, the output from blanking switch 44 is coupled to comparator level detector 51, which detector also receives a reference triggering level set input as indicated in FIG. 1. The output from detector 51 can be directly utilized as a target automatic poling trigger to immediately initiate poling of the target by conventional recovery circuitry 52, or it can be applied to monostable retriggerable multivibrator 53, which multivibrator resets counter 54 (counter 54 also receives a clock input) so that counter 54 provides a timed delay before initiating a trigger pulse output to start the automatic poling sequence by recovery circuitry 52.

Effecting recovery by recovery circuitry 52, as well as the circuitry utilized, varies depending upon the particular manufacturer of the pyroelectric tube. For the Pyricon Thermal-Television Pickup Tube manufactured by Thomson-CSF, for example, the start poling input signal is coupled through an AND gate (which also receives a field blanking input) to a counter/timer which supplies inputs to a Target V. store, a Vg4 store, and a Vg1 store, each of which provides an output to a TTL/HV interface providing outputs to the target, g4 and g1. The poling sequence used with this arrangement, which is implemented by solid state switches or by relay control, is to set the signal-electrode potential 100V to 150V below Vg4 in less than 20 ms; scan the target with an intense electron beam with current of 5 to 10μa drawn by field mesh g4 (during this stage, due to secondary emission with $\delta > 1$, the target charges positively up to Vg4, and an electric field is established that poles the target); after 20 to 30 s, raise the signal-electrode potential to Vg4 (during this stage, because of secondary electron emission with $\delta < 1$, the target discharges until target potential equals Vg4, thus removing the poling field); cut off the electron beam (to prevent depoling when the next step is carried out); and then lowering the signal electrode potential to its normal value.

Implementation of automatic target recovery in the pyroelectric camera, by means of this invention, causes the video signal to be presented to the level detector only during the readout portion of the scan since detection is accomplished at the output side of the blanking switch which is controlled by the circular blanking circuit (a gating window could, however, also be utilized). The use of circular blanking, however, has the advantage over use of a window in that all of the active target area is presented to the level detector using circular blanking, whereas only a certain area of the target is monitored using a gating window.

It might also be noted that the basic circuit, as shown in FIG. 1, could also be implemented in reverse polarity, and the basic function would not be changed.

For a pyroelectric camera to operate in its intended manner, it is necessary to generate a uniform pedestal by secondary emission or ion bombardment during the flyback of the reading beam, which causes electrons to flow into the target through the target supply resistor during flyback. During the readout portion of the target scanning, the secondary generated pedestal is read out (i.e., the charge is neutralized) and the target accepts electrons from the reading beam, hence the electrons flow out of the target during readout.

The waveform shown in FIG. 2 illustrates a typical signal obtained at point X (which signal, as indicated in FIG. 1, typically represents the output of the camera tube after being amplified in non-inverting preamplifier 18). The pedestal signal is the same in both fields (open and closed) since it is independent of shutter action. The pedestal signal is clamped to the DC-reference signal (i.e., is DC-restored) by the active DC-clamp the clamping action of which is provided and controlled by the video line clamp pulse. The magnitude of the DC-reference signal of the clamp circuit is controlled by automatic balancing circuit 31.

As indicated in FIG. 2, the signal during flyback is of much larger amplitude than the signal during readout (this is due to the short flyback time available for pedestal generation). By introducing a blanking switch, the switching time and function of which is controlled by the circular blanking signal, it is possible to eliminate the flyback pedestal portion of the tube output and to maintain the readout portion of the signal at or near ground potential, as depicted in FIGS. 3A and 3B for open field and closed field, respectively. As indicated, the open field and closed field pedestal signals are the same if there is no optical input.

By introducing an optical signal onto the tube target and by using a phase locked shutter at the field rate, the camera tube will see the scene during one field and the opaque shutter during the next field, superimposing a negative going signal for the open field signal (assuming a hot target), and during the closed field the reverse polarity will be superimposed on the pedestal. As long as the signal level generated by the optical structure does not exceed the magnitude of the readout pedestal level, then the open field and closed field signals are almost identical in amplitude and the pyroelectric camera tube works within its linear dynamic range.

If, however, a high intense spot, for example, is imaged and its intensity is increased until the signal produced by the "hot spot" is considerably larger than the readout pedestal level, the negative going signal can be much larger than the readout pedestal level. The positive signal from the closed field is, however, limited to the magnitude of the readout pedestal, since the charge on the target can only be neutralized down to the cathode level potential.

Increasing the "hot spot" intensity further until the potential on the target is sufficiently high, such that the secondary emission coefficient becomes greater than unity, causes generation of secondary electrons during readout resulting in electrons flowing into the target via the target biasing resistor, which causes a positive signal to be superimposed on the pedestal.

The signal generated from the area of target crossover is the same in the open field and closed field since it is a signal generated internally to the camera tube and is independent of the optical signature signal. The magnitude of the crossover signal is, however, directly controlled by the reading beam of the camera tube and is several magnitudes higher than the signal which could be generated by an intense "hot spot" being imaged, but during the closed field, the amplitude of the "hot spot" is limited to the pedestal level.

FIGS. 4A and 4B illustrate the video signal obtained from the open field and the closed field, respectively, in an overload condition. As indicated, the "hot spot" intensity is sufficient to produce a video signal level exceeding the pedestal level of the pedestal for the open field signal, however, in the case of the closed field, the signal level is limited to the magnitude of the pedestal.

FIGS. 5A and 5B illustrate the situation when a spot on the target has reached the crossover potential while adjacent the crossover area and while a high intensity spot is being imaged which does not cross the target. As the crossed over area of the target is being scanned, additional secondary electrons will be removed from the target by the reading beam, causing the crossed over area of the target to grow until the whole target area has been crossed over, at which point the signal characteristic, as shown in FIGS. 6A and 6B, is obtained.

As illustrated in FIGS. 5 and 6, a target area which is crossed over will produce a positive signal at point Y (as indicated in FIG. 1) of the video amplifier which has an amplitude much larger than any of the signals that could be generated by an optical input.

By simple level detection in the positive direction at point Y, is possible to determine if there is a crossed over area on the target (or if the whole target is crossed over). The output of the level detector is then used to trigger the automatic target poling circuit which then will return the tube back to normal operation.

In some cases it is not desirable to repole the target as soon as the area of the target is crossed over, but instead to continue to image for a given amount of time in order not to lose valuable information after which poling is initiated. This time delay can be implemented in various ways, one of which is shown in FIG. 1.

The implementation of the time delay, as shown in FIG. 1, has several advantages over a simple time delay.

As shown, the level detector output triggers a retriggerable monostable multivibrator, which, in turn, controls the enable input of the counter. As long as the multivibrator is in the triggered state, the counter is counting, and, after a given time, the counter will produce an output triggering the automatic poling circuit. However, in order to produce an automatic poling trigger output, it is required that the monostable multivibrator remain retriggered for the entire time. If, for some reason, the tube is capable of discharging the crossover area on the target, then the trigger to the multivibrator is lost and it will time out and reset the counter. This circuit therefore acts as a safeguard to prevent triggering of the automatic poling circuit due to a momentary overload or due to a noise spike.

As brought out hereinabove, the event of crossover heretofore had to be detected by an operator and, after detection, the operator had to initiate the crossover circuitry, normally by use of a push button control. By means of this invention, automatic initiation of recovery is achieved without the necessity of operator intervention. This enables greater use to be made of the pyroelectric camera, including, for example, use in situations when it is impossible, or at least undesirable, to have an operator present, as, for example, for remote surveillance and the like.

As can be appreciated from the foregoing, this invention provides a novel system and method for reliably detecting target crossover and automatically initiating recovery therefrom.

What is claimed is:

1. A system for automatic initiation of target crossover recovery in a pyroelectric camera having processing circuitry, said system comprising sensing means connected with said processing circuitry of said pyroelectric camera for sensing the presence of an electrical signal at said processing circuitry indicative of target crossover and, responsive thereto, providing a trigger output for initiating target crossover recovery.

2. The system of claim 1 wherein said sensing means includes level detecting means for receiving said electrical signal along with a reference signal has a predetermined magnitude, and providing an output only if the magnitude of said received electronic signal having a predetermined relationship with respect to said predetermined magnitude of said reference signal.

3. The system of claim 1 wherein said system includes delay means for delaying providing of said trigger output for a predetermined time period after crossover has been sensed.

4. The system of claim 1 wherein said processing circuitry of said pyroelectric camera includes video amplifying means, wherein said sensing means is connected with the output from said video amplifying means, and wherein said trigger output is provided by said sensing means only when said electrical signal appearing at the output of said video amplifying means is greater in magnitude than the magnitude of the largest electrical signal that can appear at the output of said video amplifying means when said target is not crossed over.

5. The system of claim 4 wherein said system includes signal balancing means connected with said video amplifying means for enhancing reliability of target crossover sensing.

6. The system of claim 4 wherein said system includes selecting means connected between said video amplifying means and said sensing means whereby said sensing means receives only a predetermined portion of the video signal generated by said pyroelectric camera.

7. The system of claim 6 wherein said selecting means includes blanking switch means, and wherein said predetermined portion of said video signal is the readout portion generated by said pyroelectric camera.

8. In a pyroelectric camera having processing circuitry for processing video signals generated by a pyroelectric tube, which processing circuitry includes first and second video amplifying means, blanking switch means connected between said first and second video amplifying means, and recovery means for effecting target crossover recovery, a system for automatically initiating target crossover recovery, said system including level detecting means connected between said blanking switch means and said second video amplifying means, said level detecting means receiving a reference signal and the output of said first video amplifying means coupled through said blanking switch means, said level detecting means providing a triggering output signal when the magnitude of said output coupled thereto through said balancing switch at least equals a predetermined magnitude as set by said reference signal, and said level detecting means being connected with said recovery means of said processing circuitry to thereby automatically initiate target recovery when said triggering output is produced by said level detecting means.

9. The system of claim 8 wherein said blanking switch means includes means for effecting circular blanking, and wherein said output coupled to said level detecting means through said blanking switch means includes only that portion of the video signal generated during readout of said pyroelectric tube.

10. The system of claim 8 wherein said pyroelectric camera includes automatic balancing means connected to said first video amplifying means to enhance reliability of detected target crossover by said system.

11. The system of claim 8 wherein said system includes delay means for receiving the output of said level detecting means for delaying said triggering pulse a predetermined amount of time to avoid loss of information.

12. The system of claim 11 wherein said delay means includes a monostable multivibrator connected to receive the output from said level detector and a time delay counter connected with said multivibrator to receive the output therefrom.

13. A method for automatically initiating target crossover recovery in a pyroelectric camera, said method comprising:
sensing the presence of an electrical signal at said processing circuitry that is indicative of target crossover; and
responsive to sensing of said electrical signal providing a trigger output for automatically initiating target crossover recovery.

14. The method of claim 13 wherein said method includes detecting the level of a received electrical signal at said processing circuitry and comparing the magnitude of the received signal with a reference signal and producing an output indicative of target crossover if the received electrical signal exceeds the magnitude of the reference signal.

15. The method of claim 13 wherein said method includes delaying producing of the trigger output for a predetermined time period to avoid loss of information.

16. The method of claim 13 wherein said method includes enhancing the reliability of said target crossover sensing by balancing said electrical signal prior to sensing.

17. The method of claim 13 wherein said step of sensing the presence of an electrical signal indicative of target crossover includes providing only the readout portion of the output generated by a pyroelectric camera tube for sensing.

18. The method of claim 17 wherein said step of providing only said readout portion includes coupling said output generated by said pyroelectric camera tube through circular blanking switch means.

* * * * *